US012731176B2

(12) United States Patent
Cruzada

(10) Patent No.: US 12,731,176 B2
(45) Date of Patent: Sep. 8, 2026

(54) SYSTEM AND METHOD FOR CREATING DIGITAL ART FROM PHOTOS AND VIDEOS OF COINS AND VARIOUS METHODS OF PRESENTING THE ART TO BE VIEWED

(71) Applicant: Nazareno Cruzada, San Marcos, CA (US)

(72) Inventor: Nazareno Cruzada, San Marcos, CA (US)

(*) Notice: Subject to any disclaimer, the term of this patent is extended or adjusted under 35 U.S.C. 154(b) by 268 days.

(21) Appl. No.: 18/095,531

(22) Filed: Jan. 10, 2023

(65) Prior Publication Data

US 2024/0232965 A1 Jul. 11, 2024

(51) Int. Cl.

| | |
|---|---|
| ***G06Q 30/0601*** | (2023.01) |
| ***G06T 7/70*** | (2017.01) |
| ***G06V 10/141*** | (2022.01) |
| *G06F 3/048* | (2013.01) |
| *H04N 23/60* | (2023.01) |

(52) U.S. Cl.

CPC ........... *G06Q 30/0601* (2013.01); *G06T 7/70* (2017.01); *G06V 10/141* (2022.01); *G06F 3/048* (2013.01); *H04N 23/60* (2023.01)

(58) Field of Classification Search

CPC ...... G06Q 30/0601; G06T 7/70; G06V 10/41; H04N 23/60; G06F 3/048

USPC .......................................................... 345/426

See application file for complete search history.

(56) References Cited

U.S. PATENT DOCUMENTS

| | | | | |
|---|---|---|---|---|
| 11,443,470 | B2 | 9/2022 | Stendebach | |
| 11,721,061 | B2 | 8/2023 | Price | |
| 2004/0124064 | A1* | 7/2004 | Sugata | G07D 5/005 194/328 |
| 2007/0200933 | A1* | 8/2007 | Watanabe | H04N 23/90 348/E7.086 |
| 2020/0142031 | A1* | 5/2020 | Nishita | G01S 7/481 |
| 2021/0279695 | A1* | 9/2021 | Rice | G06Q 20/12 |
| 2022/0130092 | A1* | 4/2022 | Stendebach | G11B 27/031 |

(Continued)

OTHER PUBLICATIONS

Hossfeld M., Chu W., Eich M., Adameck M.: Fast 3D-vision system to classify metallic coins by their embossed topography. Electronic Letters on Computer Vision and Image Analysis 5, 4 (2007), 47-63.*

(Continued)

*Primary Examiner* — Jin Ge

(74) *Attorney, Agent, or Firm* — WILSON SONSINI GOODRICH & ROSATI

(57) ABSTRACT

A method of creating digital art from photos and videos of coins and various methods of presenting this art to be viewed, including presenting the digital art in a large frame that can hang on a wall for view at hundreds of times magnification and with very good to excellent lighting, which accentuates the coin's beauty and allows coins to be presented in a more user-friendly way than the traditional methods such as 2×2" cardboard holders or "flips", cardboard albums, or plastic holders called "slabs" that are provided by third party grading companies, which make it difficult to appreciate the beauty of certain collectible coins because most coins are small and it's hard to see the details with the naked eye, where one would have to use a magnifying lens or a jeweler's loupe to see the coin's details.

20 Claims, 4 Drawing Sheets

(56) References Cited

U.S. PATENT DOCUMENTS

| | | | | |
|---|---|---|---|---|
| 2023/0419612 | A1* | 12/2023 | Matsuno | G06T 15/10 |
| 2024/0242287 | A1* | 7/2024 | Rice | G06F 3/04815 |

OTHER PUBLICATIONS

Mudge, M., Voutaz, J.-P., Schroer, C., and Lum, M. 2005. Reflection transformation imaging and virtual representations of coins from the Hospice of the Grand St. Bernard. In Proc. VAST.*

Zambanini S., Kampel M.: Coin data acquisition for image recognition. In Proc. of 36th Annual Conference on Computer Applications and Quantitative Methods in Archaeology. 2008.*

Youtube video Amazing New Way To View Coins Online! "https://www.youtube.com/watch?v=4mStVlcL-_g&t=276s" NuTilt 2020.* https://nutilt.com or www.nutilt.com.

Screen captures from YouTube Channel entitled nuTilt. Joined on Jan. 23, 2017 by nuTilt: pp. 1-2. Retrieved from Internet: https://www.youtube.com/@nuTilt on Feb. 17, 2026.

Screen captures from YouTube video clip entitled Lustrous Full Spectrum Toned Morgan Dollar 1881-S $1 PCGS MS64. Uploaded on Feb. 9, 2022 by nuTilt: pp. 1-4. Retrieved from Internet: https://www.youtube.com/shorts/9jQkzQVnNSU on Feb. 17, 2026.

* cited by examiner

SYSTEM AND METHOD FOR CREATING DIGITAL ART FROM PHOTOS AND VIDEOS OF COINS AND VARIOUS METHODS OF PRESENTING THE ART TO BE VIEWED

APPLICATION PRIORITY

I claim priority of provisional application No. 63/300,647 filed on Jan. 19, 2022 titled "A method for creating digital art from photos and videos of coins and various methods of presenting the art to be viewed."

TECHNICAL FIELD

The invention relates to a system and method of creating digital art from photos and videos of coins and various methods, devices and embodiments of presenting this art to be viewed.

BACKGROUND

The prior art of this invention includes imaging systems such as the following.

The nuTilt Imaging system (www.nutilt.com) herein referred to as "nuTilt" which was awarded U.S. Pat. No. 11,721,061B2 and which has technology that captures digital images of a coin from multiple tilt angles and joining them together to create an animated image. A light source is shone on the coin at an angle and then moved around the circumference of the coin to give the reflected light on the image a spinning or cartwheel effect. This image can then be presented to a viewer via a mobile app or a computer web browser. With the mobile app, the viewer can tilt the mobile phone to induce a change or movement in the image of the coin, similar to tilting a coin in one's hand. With the computer web browser, the viewer can click on buttons and other screen controls to induce these changes. The nuTilt Imaging technology does not join multiple coin images into a single layout but rather focuses on showing an individual coin by itself. Their technology does not induce view changes or movement to multiple coin images. The nuTilt Imaging technology also does not load the image files into a digital art frame to be viewed via that medium. The nuTilt Imaging service is only for coins that are graded and encapsulated by a grading company such as NGC or PCGS. They do not accept raw coins for their imaging services. Thus the images show the coin in the plastic holder and the holder's plastic prongs that hold the coin in the center.

SUMMARY

This invention is a system and method of creating digital art from photos and videos of raw unholdered coins and various methods of presenting the art to be viewed. The method comprises these main steps:

1. Creating digital photos or videos of raw unholdered coins;
2. Creating the digital art by joining the digital photo or video files into a compilation or composite layout;
3. Presenting the digital art to be viewed via a plurality of hardware devices & methods.

DETAILED DESCRIPTION

Described herein is a system and method of creating digital art from photos and videos of coins and various methods, devices and embodiments of presenting this art to be viewed.

Figure 1:
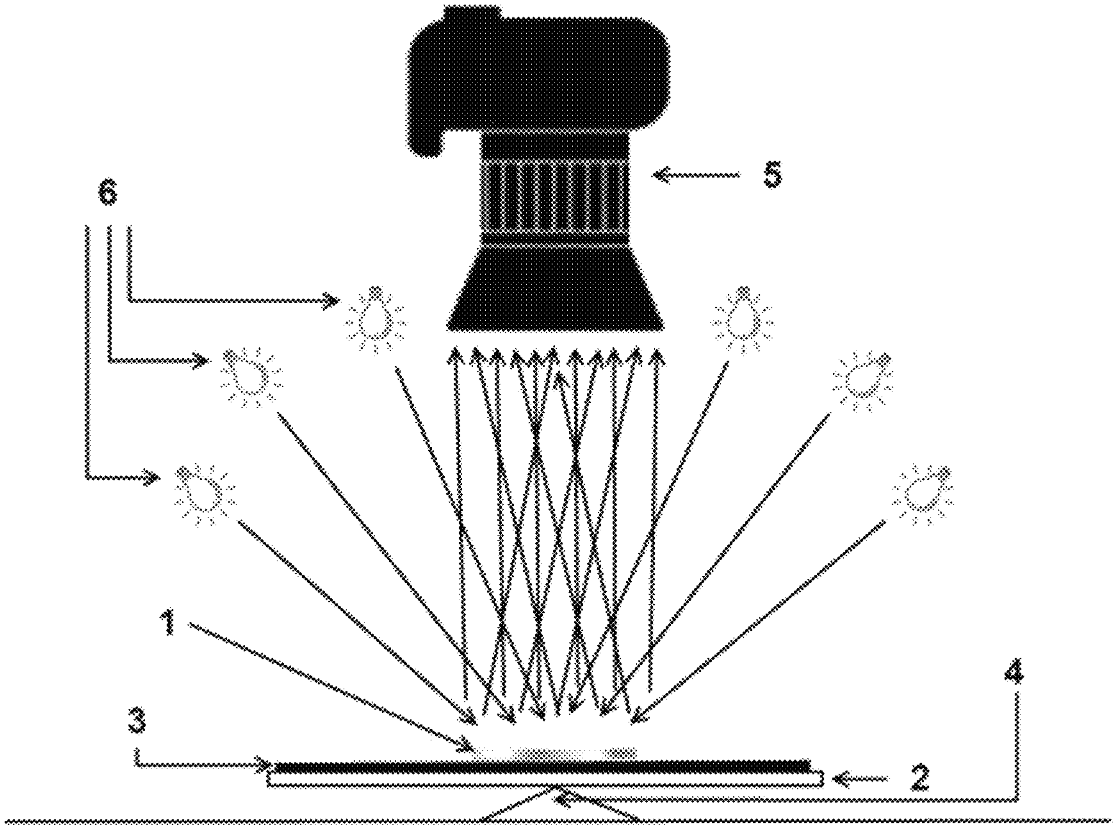
FIG. 1 is an embodiment of the coin digital images capture or recording equipment and configuration.

The first step is to create digital photos or videos of raw unholdered coins. A physical setup consisting of physical components is utilized. As shown in FIG. 1, the parts or sections may include:

- a coin, which is designated with the reference number 1;
- a first object 2 comprising a hard flat thin object such as a piece of sheet metal, wood or plastic, with a diameter an inch or more larger than the diameter the coin;
- a layer of material 3 such as black velvet or felt placed on the hard flat surface of this first object which allows it to absorb light so as to eliminate any light in the background and focus on the coin;
- a second object 4 which is triangular in shape and with its high point or peak positioned at the center of the bottom of the first object;
- a digital video camera 5;
- and a plurality of multiple light sources 6 such as are small LED lights, arranged in an array pattern around the camera which direct light on the coin.

The coin 1 is placed on the layer of black velvet or felt 3 on the first object 2. This first object 2 rests on a second object 4 which is triangular in shape and with its high point or peak positioned at the center of the bottom of the first object. This allows the first object 2 to tilt in any angle along its 360 degree circumference. The hard flat surface of the first object 2 will have a layer of material 3 that absorbs light so as to eliminate any light in the background and focus on the coin. This layer of material 3 can be black velvet or felt.

Figure 2:
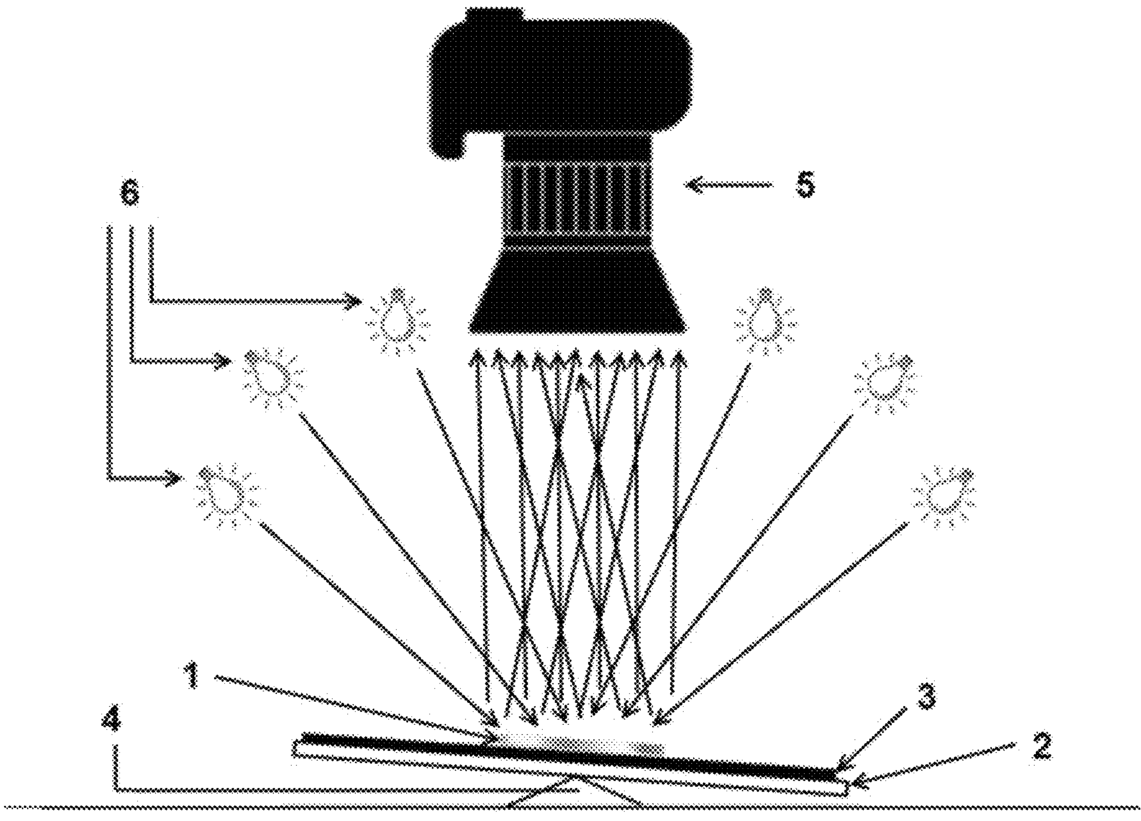
FIG. 2 is an embodiment of the process of the coin digital images capture or recording equipment and configuration whereby the coin is tilted and the image is captured or recorded, and whereby this tilt is induced all thru the 360 degree circumference of the coin.
Figure 3:
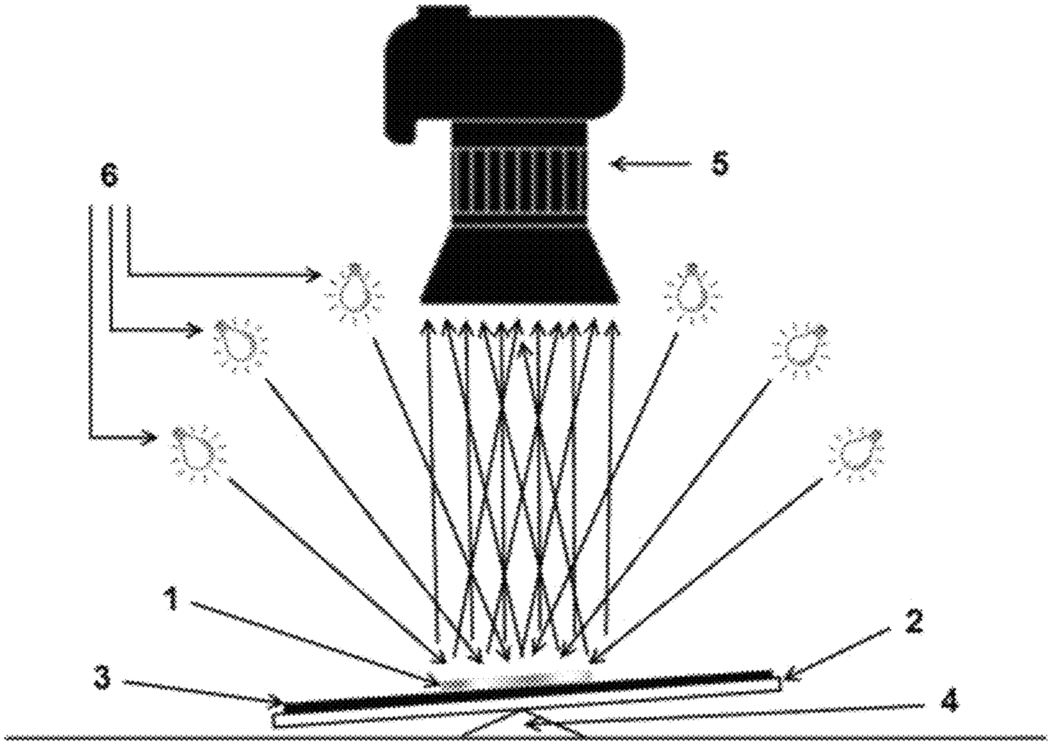
FIG. 3 is another embodiment of the process of the coin digital images capture or recording equipment and configuration whereby the coin is tilted and the image is captured or recorded, and whereby this tilt is induced all thru the 360 degree circumference of the coin.

Once this configuration is ready, a digital video camera 5 pointed at the center of the coin 1 from the top and a tilt is induced on the first object 2 on every degree of the 360 degree of its circumference. As shown in FIGS. 2 and 3, this tilt will result in the light shining on the coin at an angle and this is captured by the video camera 5 as a unique shine effect. This tilt is induced in a clockwise or counter-clockwise rotation, giving the shine a spinning or "cartwheel" effect. If the coin 1 doesn't have a shine but instead has colors, the light shining from multiple different angles of this tilt and rotation will reveal and brighten the colors and give the image of the coin 1 a shimmering or "kaleidoscopic" effect.

Individual digital photos can be taken at each degree of the 360 degree circumference of the coin 1 as the coin 1 is tilted and used to create these effects but digital video is preferred as it is continuous, much easier and more precise in capturing each tilt angle. File formats for digital videos include MP4 and Flash movies.

Figure 4:
FIG. 4 is a framed 3×3 layout of 9 coins, wherein the digital file of the finished digital art composition is loaded into the computer memory of a physical digital art frame such as one with an LCD or OLED screen where the digital art can be viewed on screen, whereby the black velvet or felt becomes the black background and only the coin is showing.

Once these dynamic imaging effects are recorded on digital video, the second step is to create the digital art by joining the digital photo or video files into one compilation or composite layout from multiple photos or videos joined together. An example is joining together individual videos of 9 coins into a 3×3 layout—as shown in FIG. 4, or of 20 coins into a 5×4 landscape layout. The multiple digital video files are joined together into one digital video file and loaded into a digital art frame to be viewed, also shown in FIG. 4. When joining together these digital video files into a single layout, their movement and effects can be arranged in different ways so as to give the entire layout variable dynamic movements. An example is to have all the coins spinning in one direction or to have the coins spin one at a time, going from one coin to the next, from top left to the bottom right.

The joining together of these multiple digital video images and files into a single layout can be done using a video editing software program. This single layout presentation can also be done within a computer software program or application that presents a multi-sectional singular window to be viewed. This software program or application can be written in a popular computer programming language such as Java or Microsoft .NET and is the type that runs on an operating system such as Linux or Microsoft Windows. This operating system runs on a computer motherboard or circuit board.

Once the digital video files are created and finished, the third step is to utilize various methods of presenting the art to be viewed including a physical hardware device—as shown in FIG. 4.

In one embodiment, the digital video files are loaded into the computer memory of a physical digital art frame device FIG. 4 and physical buttons on the digital art frame can be used to view a selected file or to go from viewing one file to another or from one variable dynamic movement to another. This includes digital art frames such as those with an LCD or OLED screen, a flat screen TV, a tablet, a laptop, or a regular desktop computer.

In a second embodiment, a physical digital art frame device FIG. 4 with a touch screen can be used to present the compilation layout set inside a software program or application window with virtual buttons along the border. The software program files along with the digital video files are loaded into the computer memory of the digital art frame. Once the software program is run, it presents the images in its application window on the screen, and the images inside the compilation layout can then react interactively to a viewer's touch, where the viewer can rotate individual or multiple coins by flicking them with their fingers or using the virtual buttons to go from viewing one file to another. The viewer can flick an image of a coin from side to side or from top to bottom, and the coin's image will change from the front to the back of the coin. The viewer can flick a finger along the outer rim of the coin's image and it will spin momentarily in the same direction as the movement of the finger, then the spin will come to a stop.

In a third embodiment, the digital file can be converted to a non-fungible token or "NFT" by uploading it to an NFT platform website. This NFT can then be viewed via hardware devices such as computer web browser, virtual reality or "VR" goggles, or a video game console. In similar functionality to the second embodiment, if the hardware device allows the viewer to interact virtually with the digital art NFT image, the viewer can induce the same effect as he or she is able to do in the physical realm in second embodiment such as making the coin's image spin or flip front to back or to make all the images spin in one or another direction.

In a fourth embodiment, this NFT file can be bought and sold online via the NFT platform website. Once sold, the NFT's ownership is transferred via the website's transaction functionality. The functionality of the digital art itself remains the same.

What is claimed is:

1. A system for creating and displaying digital art from a coin, the system comprising:
- the coin;
- a first object comprising a platform and a layer positioned on top of the platform, wherein the layer is configured to hold the coin and absorb and eliminate light surrounding the coin;
- a second object that is triangular in shape and comprises a high point or peak positioned at a central point under the first object, so as to allow the first object to tilt in one or more angles along a 360-degree circumference;
- a digital recording device located above and directed towards a central point of the coin, wherein the digital recording device is configured to create at least one photo or video file of the coin; and
  - a plurality of light sources arranged in an array pattern around the digital recording device and configured to direct light towards the coin, wherein the plurality of light sources are positioned at different heights or angles relative to the coin.

2. The system of claim 1, wherein the platform comprises metal, wood, or plastic.

3. The system of claim 1, wherein the layer comprises black velvet or felt.

4. The system of claim 1, wherein the plurality of light sources are configured to produce a shine pattern on a surface of the coin.

5. The system of claim 1, wherein when a tilt is induced on the first object, the light from the plurality of light sources shines on the coin at multiple angles and creates a shine effect.

6. The system of claim 5, wherein, when the tilt is induced on the one or more angles along the 360-degree circumference of the coin in a clockwise or counter-clockwise rotation, the array pattern of the plurality of lights causes a combination of the resulting shine effect to create a spinning or cartwheel effect.

7. The system of claim 6, wherein the digital recording device is configured to capture the spinning or cartwheel effect.

8. The system of claim 5, wherein the coin comprises at least one color and wherein when the tilt is induced on the one or more angles along the 360-degree circumference of the coin in a clockwise or counter-clockwise rotation, the array pattern of the plurality of light sources causes a combination of the resulting shine effect to create a shimmering or kaleidoscopic effect.

9. The system of claim 8, wherein the digital recording device is configured to capture the shimmering or kaleidoscopic effect.

10. The system of claim 1, further comprising a physical digital art frame device for holding the digital art and displaying the at least one digital photo or video file created by the digital recording device.

11. The system of claim 10, wherein the physical digital art frame device comprises:

a digital screen configured to display a compilation or composite layout of a plurality of digital photo or video files created by the digital recording device, wherein the plurality of digital photo or video files are from a plurality of coins;

a computer motherboard or circuit board;

a physical frame;

a plurality of computer memory units containing the plurality of digital photo or video files; and a plurality of physical buttons on the digital art frame device configured to (i) select a subset of the plurality of digital photos or video files to display; (ii) change a displayed movement; or (iii) view at least one of the coins in the plurality of digital photo or video files.

12. The system of claim 10, wherein the physical digital art frame device comprises:

a digital touch screen configured to display a compilation or composite layout of a plurality of digital photos or video files created by the digital recording device;

a computer motherboard or circuit board;

a physical frame;

a plurality of computer memory units containing the plurality of digital photo or video files; and the digital touch screen comprises a plurality of digital or virtual buttons configured to enable a viewer to rotate or induce motion of individual or multiple coin images by touching the coin images or by using the virtual buttons, wherein the coin images are from the plurality of digital photo or video files.

13. A method of creating digital art from a coin using the system of claim 1, the method comprising:

(a) placing the coin on top of the first object;

(b) tilting the first object in the one or more angles along a 360-degree circumference;

(c) shining, on the coin, the plurality of light sources; and (d) creating the at least one digital photo or video file of the coin with the digital recording device so as to create the digital art.

14. The method of claim 13, further comprising joining a plurality of digital photo or video files into a compilation or a composite layout, wherein the joining is performed with a video editing software program and wherein the plurality of digital photo or video files are from a plurality of coins.

15. The method of claim 13, wherein the tilting is in one or more angles such that it causes the light shining on the coin from the plurality of light sources to create a shine effect.

16. The method of claim 15, wherein the tilting comprises rotating the first object in a clockwise or counter-clockwise direction so as to create a spinning or cartwheel effect due to the light shining from multiple different angles on the tilted and rotating coin, wherein the spinning or cartwheel effect is captured by the digital recording device.

17. The method of claim 15, wherein the coin comprises at least one color, wherein the tilting comprises rotating the first object in a clockwise or counter-clockwise direction so as to create a shimmering or kaleidoscope effect due to the light shining from multiple different angles of the tilted and rotating coin, wherein the shimmering or kaleidoscope effect is captured by the digital recording device.

18. The method of claim 13, further comprising:

displaying a plurality of digital photo or video files on a digital screen of a physical digital art frame device, wherein the physical digital art frame device comprises a plurality of buttons configured to (i) select a subset of the plurality of digital photos or video files to display; (ii) change a displayed movement; or (iii) view at least one of the plurality of digital photo or video files.

19. The method of claim 13, further comprising converting the at least one digital photo or video files into a non-fungible token (NFT) by uploading the at least one digital photo or video files to an NFT platform website, and wherein the NFT can be viewed via hardware devices selected from the group consisting of a computer, virtual reality (VR) goggles, and a video game console.

20. The method of claim 19, wherein the NFT is bought or sold online via the NFT platform website and an ownership in the NFT is transferred via the website, while the functionality of the digital art remains the same.

* * * * *